(12) United States Patent
Tailor et al.

(10) Patent No.: US 12,313,190 B2
(45) Date of Patent: May 27, 2025

(54) PRESSURE EQUALIZATION IN COMPOSITE PIPES

(71) Applicant: SHAWCOR LTD., Toronto (CA)

(72) Inventors: Dilip Tailor, Toronto (CA); Jacob Preston, Toronto (CA); Mark Phillip Brandon, Toronto (CA); Ronald J. Dunn, Toronto (CA); Pascal Laferriere, Toronto (CA)

(73) Assignee: SHAWCOR LTD., Toronto (CA)

( * ) Notice: Subject to any disclaimer, the term of this patent is extended or adjusted under 35 U.S.C. 154(b) by 293 days.

(21) Appl. No.: 17/787,514

(22) PCT Filed: Dec. 18, 2020

(86) PCT No.: PCT/CA2020/051765
§ 371 (c)(1),
(2) Date: Jun. 20, 2022

(87) PCT Pub. No.: WO2021/119843
PCT Pub. Date: Jun. 24, 2021

(65) Prior Publication Data
US 2022/0381375 A1    Dec. 1, 2022

Related U.S. Application Data

(60) Provisional application No. 62/951,824, filed on Dec. 20, 2019.

(51) Int. Cl.
*F16L 11/08*    (2006.01)
*F16L 9/147*    (2006.01)
(Continued)

(52) U.S. Cl.
CPC ............. *F16L 11/085* (2013.01); *F16L 9/147* (2013.01); *F16L 33/01* (2013.01); *F16L 33/2076* (2013.01); *F16L 55/07* (2013.01)

(58) Field of Classification Search
CPC ......... F16L 11/085; F16L 9/147; F16L 33/01; F16L 33/2076; F16L 55/07; F16L 33/207
(Continued)

(56) References Cited

U.S. PATENT DOCUMENTS 3,735,475 A * 5/1973 Marriott .................... F16L 9/18
29/516
4,567,916 A * 2/1986 Antal ....................... F16L 33/01
138/104
(Continued)

FOREIGN PATENT DOCUMENTS

WO    2003069211 A1    8/2003
WO    2019239093 A1    12/2019

OTHER PUBLICATIONS

International Preliminary Report on Patentability dated Jun. 30, 2022 issued in international application No. PCT/CA2020/051765.
(Continued)

*Primary Examiner* — David Bochna
(74) *Attorney, Agent, or Firm* — Hunton Andrews Kurth LLP

(57) ABSTRACT

A flexible polymeric pipe for transportation of oil, gas or water, having an unbonded reinforcing intermediate layer between two polymeric layers. The pipe has a vent for the intermediate layer which allows venting of gas from the intermediate layer through to the exterior environment. The vent is generally impervious to water but pervious to air and gas.

7 Claims, 8 Drawing Sheets

(51) Int. Cl.
*F16L 33/01* (2006.01)
*F16L 33/207* (2006.01)
*F16L 55/07* (2006.01)

(58) Field of Classification Search
USPC .......................................................... 285/13
See application file for complete search history.

(56) References Cited

U.S. PATENT DOCUMENTS

| | | | | |
|---|---|---|---|---|
| 4,830,062 A * | 5/1989 | Yamamoto | ................ | F16L 9/12 |
| | | | | 264/127 |
| 4,863,197 A * | 9/1989 | Munoz | ................ | F16L 33/2076 |
| | | | | 285/256 |
| 5,149,142 A * | 9/1992 | Walko | ................... | F16L 23/125 |
| | | | | 285/55 |
| 6,039,083 A * | 3/2000 | Loper | .................. | F16L 11/083 |
| | | | | 138/135 |
| 7,585,211 B2 * | 9/2009 | Qualy | .................. | H05K 5/0213 |
| | | | | 454/270 |
| 7,976,920 B2 | 7/2011 | Braad | | |
| 10,228,009 B2 * | 3/2019 | Pelletier | ................ | G06F 1/1656 |
| 11,193,615 B1 * | 12/2021 | Francis | ................... | F16L 33/01 |
| 2003/0159733 A1 * | 8/2003 | Ransom | ................. | F16K 24/04 |
| | | | | 137/312 |
| 2004/0050442 A1 * | 3/2004 | Glejbol | ................ | F16L 11/082 |
| | | | | 138/131 |
| 2007/0036925 A1 * | 2/2007 | Braad | ................... | F16L 11/081 |
| | | | | 428/36.9 |
| 2021/0356065 A1 * | 11/2021 | Zaborszki | ............... | F16L 33/01 |

OTHER PUBLICATIONS

UAE Office Action Summary/Examination results dated Oct. 3, 2024 issued in P6001183/2022.

* cited by examiner

PRESSURE EQUALIZATION IN COMPOSITE PIPES

FIELD OF INVENTION

The invention relates to pressure equalization in composite pipes, in particular, pressure equalization of the annulus of composite pipes or lined pipes.

BACKGROUND

Flexible composite pipes, are well known and commonly utilized. A typical flexible composite pipe comprises an inner layer of a polymer such as polyethylene, epoxy, or polyester, a reinforcing layer, which is typically a fiberglass rovings, weave or wrap, but may be any reinforcing fiber such as carbon fiber, aramid fiber, or the like, and an outer layer of polymer. The term "flexible" refers to the ability of the pipe to be wound around a reel, or curved during an install. In order for the pipe to be flexible, the outer and inner layers of polyolefin are not bonded together through the reinforcing layer, but remain separate layers, with the reinforcing layer creating, and referred to as, an "annulus" between them.

When flexible composite pipes are used to carry oil or gas, often components of this oil or gas may diffuse out of the polymer and into the annulus. This creates a pressure build up in the annulus. This pressure build up in the annulus can, in extreme cases, result in the collapse of the inner polyolefin layer, resulting in pipe failure (Buchner et al., Oilfield Engineering with Polymers 2003, London, Nov. 3-4, 2003)

As a result, venting of the annulus layer is known. Venting may occur through apertures within the exterior polyolefin layer, or at the point at which pipes are connected together.

Flexible composite pipes (often 50 to 1000 m in length) are often connected together to form a longer pipeline often several kilometers (or several hundred kilometers) in length. Often, they are connected together utilizing steel crimp seals such as the one shown in cross-section in FIG. 1. Flexible pipe length 10 comprises an inner polyolefin layer 12, fiberglass reinforcing layer 14, and an outer polyolefin layer 16, which form a conduit 18 through which oil or gas can be transported. The end of the pipe length 10 is shown connected to crimp fitting 20, comprising mandrel 22 which fits into the end of the flexible pipe length 10, and crimped sleeve 24, which fits outside of the end of the flexible pipe length 10. Mandrel 22 comprises o-rings 26 which aid in sealing the connection between the pipe length 10 and the crimp fitting 20. Crimp fitting 20 also comprises flange 28 containing bolt apertures 30 for connecting one crimp fitting 20 to an adjacent crimp fitting (not shown) in order to connect two pipe lengths together.

Prior art crimp fittings 20 such as the one shown in FIG. 1 also comprises a vent 32 which is an aperture in the crimped sleeve 24 configured so that it provides a conduit between the external environment and the reinforcing layer 14. The vent 32 can help avoid pressure build up in the annulus (aka the reinforcing layer 14) within the proximity of the crimp fitting 20 when the fitting 20 is pushed onto the end of the pipe length 10. It can also be useful in that, if there is a build-up of pressure or gas within the annulus (i.e. the reinforcing layer 14), it can be vented to the outside at the crimp fitting 20.

Unfortunately, one disadvantage of vent 32, or any venting of the annulus either within the pipe length of at the crimp fitting by means of an aperture, is that moisture from the external environment can enter the annulus through such aperture. Such moisture can weaken certain reinforcing layer fabrics in the annulus. Such moisture may also weaken the reinforcing layer when subjected to freeze/thaw cycles. Weakening of the reinforcing layer can result in its failure as a reinforcing layer, causing pipe collapse or rupture. Weakening of the reinforcing layer may also result in collapse of the inner polyolefin layer, causing pipe failure.

Steel pipeline for the transport of oil and gas is also well known. Internal liners of such pipes is well known; for example, HDPE liners of steel pipeline have been widely used for well over 30 years in Canada (Canada's Oil and Natural Gas Producers Best Management Practice, Use of HDPE Lined Pipelines, August, 2019). Liners can be installed in the field into newly constructed pipelines, or retrofit into existing unlined pipelines. HDPE liners are used for various pipeline services, including oil, natural gas and water multiphase fluid pipelines; natural gas gathering production pipelines; and oilfield water injection or disposal pipelines. Resistance to corrosive agents within the service fluid, such as wet carbon dioxide or dissolved salts, is one of the primary benefits of a polyolefin liner such as an HDPE liner.

Unfortunately, all plastics will allow gases to permeate to some extent. Gas therefore accumulates in the annulus between the liner and the steel pipe; if not vented, the annulus pressure will eventually build up to the pipeline operating pressure. Gas in the annulus is a significant contributor to liner collapse, especially when the pressure within the main conduit is reduced, for example during shutdowns, major pressure fluctuation in the conduit or in vacuum operating conditions. Liners may buckle under the differential pressure of the annulus in relation to the internal pressure of the liner. Once the initial liner deformation occurs it may proceed to fully collapse since less additional force is required to extend a collapse length after initiation. Thus vents are required to remove annulus pressure build up due to the permeation of gas, and to check for liner breaches. Canadian Standards Association CSA Z662-19 requires operators to monitor vents regularly. Annulus vent stations are often placed at the opposite ends of lined pipeline segments, adjacent to the flanges. Location of vents must be carefully selected. For example, consideration must be given to proximity of water crossings, high water table conditions and drainage. Often vents are installed below ground level, with riser tubing that is fixed to an above-ground post. In some cases, access culverts are installed to provide permanent access to the liner flanges and vent piping. Like with flexible pipes, vents are often incorporated within a connection flange, with liner flange adaptors comprising a vent screen which lines up with a vent connection port on the flange end (See FIGS. 2 and 3, for example). Steel flange 40 connects two pipe ends together with bolts placed through bolt holes 46 and retains thermoplastic flange 44 through steel retaining ring 42. Shown is vent connection port 52 aligned with a vent 54, which is an aperture through steel connector 56 which provides venting of annulus 58 between steel connector 56 and thermoplastic sleeve 60. FIG. 3 shows a liner flange adaptor in isolation, comprising liner 62, vent screen 64, and liner flange 66.

Common issues with such vents are plugging and water ingress.

A further lined pipe annular venting device configuration is taught in WO 01/94820A1.

Fabric membranes which allow the passage of air and water vapour, but which are generally repellant to liquid, are known. For example, polytetrafluoroethylene (PTFE), more commonly known as Teflon™, can be thermo-mechanically expanded to form a porous film having about 9 billion pores per square inch, with each pore approximately 1/20,000 the size of a water droplet, making it impenetrable to liquid water while still allowing more volatile water vapour molecules to pass through. Expanded PTFE (ePTFE) has desirable properties such as being waterproof and breathable, but is relatively fragile, pervious to mechanical abrasion and damage caused by sharp objects, for example. Certain such expanded PTFE ("ePTFE") bonded to a fabric in, for example a two or three-layer laminate, are known in the art and commercially available as Gore-Tex™ (W. L. Gore and Associates (USA)). The basic ePTFE patent, U.S. Pat. No. 3,953,566, issued in 1976, with many other patents following including U.S. Pat. Nos. 4,187,390, 4,194,041. While primarily used in clothing such as rain jackets, Gore-Tex has been used as a synthetic medical material in a variety of applications, including membrane implants for glaucoma surgery, sutures, vascular grafts, heart patches, and the like. A wide variety of Gore-Tex based materials are available for a variety of applications. For example, W. L. Gore and Associates manufacture a variety of vents for a variety of industries, including automotive vents, packaging vents, protective vents for outdoor electronics, and portable electronic vents. The W. L. Gore website (www.gore.com/products/categories/venting?view=automotive-vents) describes Gore-Tex vents as being able to equalize pressure bidirectionally, equalizes pressure in a continuous manner, blocks contaminants such as dust, dirt and debris, provides water and fluid protection such as spray, immersion and splash, reduces condensation, resists chemicals, and minimizes acoustic degradation. Commercial applications are taught to include a low pressure evacuation vent for automotive battery packs, vents for control units, sensors and motors, vents for headlamp assemblies and fog lamps, managing pressure differentials in automotive fluid reservoirs, and the like. Gore-Tex vents have application for chemical containers, and the like. For example, W. L. Gore and Associates manufactures an acoustic vent which allows for waterproof speakers—air can travel through the vent but water is kept out. Gore-Tex vents are commercially available in a choice of adhesive, screw-in and snap-in constructions. For example, the weldable automotive vents offer operating temperatures from −40° C. to as high as 125° C., resistance to water entry up to a pressure of at least 60 kPa/30 sec, typical airflow at standard ambient pressure and temperature of about 32/5 l/hr/cm$^2$ at 7 kPa, all in a ePTFE-PET multi-layer laminate of about 0.48 mm in thickness. Other commercially available vents are available as thin as 0.195 mm and offer even higher temperature resistance. Similar ePTFE vents are also commercially available from other sources, such as the Porex® Virtek™ vents available from Porex Corporation (Fairburn, GA).

Gore-Tex vents are typically used for small pressure differentials affecting sensitive electronic devices in sealed containers, or small volume sealed containers of liquid. The Gore-Tex vent website shows a pictographic explaining many dozens of uses for Gore-Tex vents; however, all of these are for venting otherwise sealed small volume applications, such as headlamp assemblies, small electronic devices, or control systems.

SUMMARY OF THE INVENTION

Figure 1:
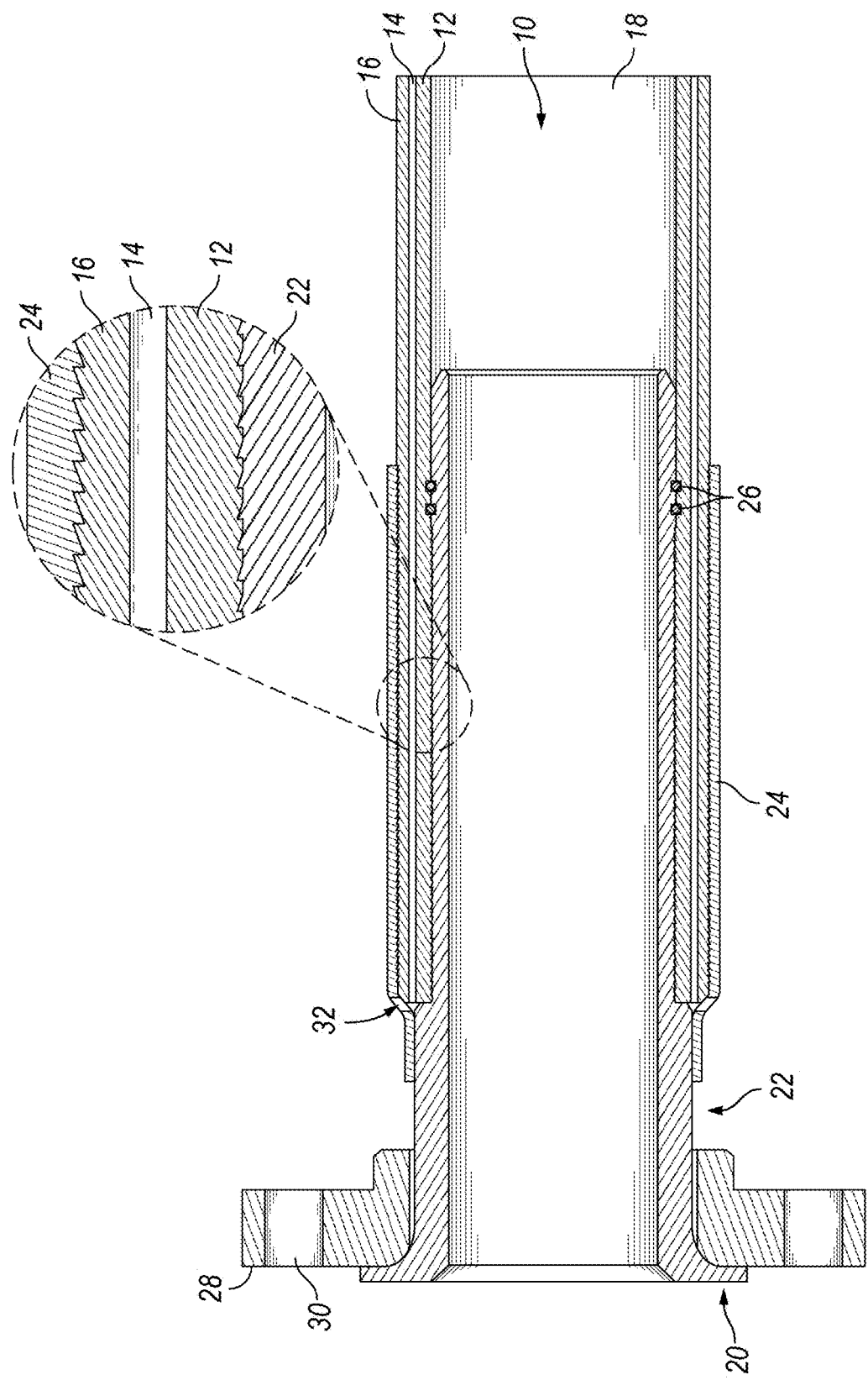
FIG. 1 is a schematic cross-section of a prior art vented crimp fitting fitted to the end of a flexible composite pipe.
Figure 2:
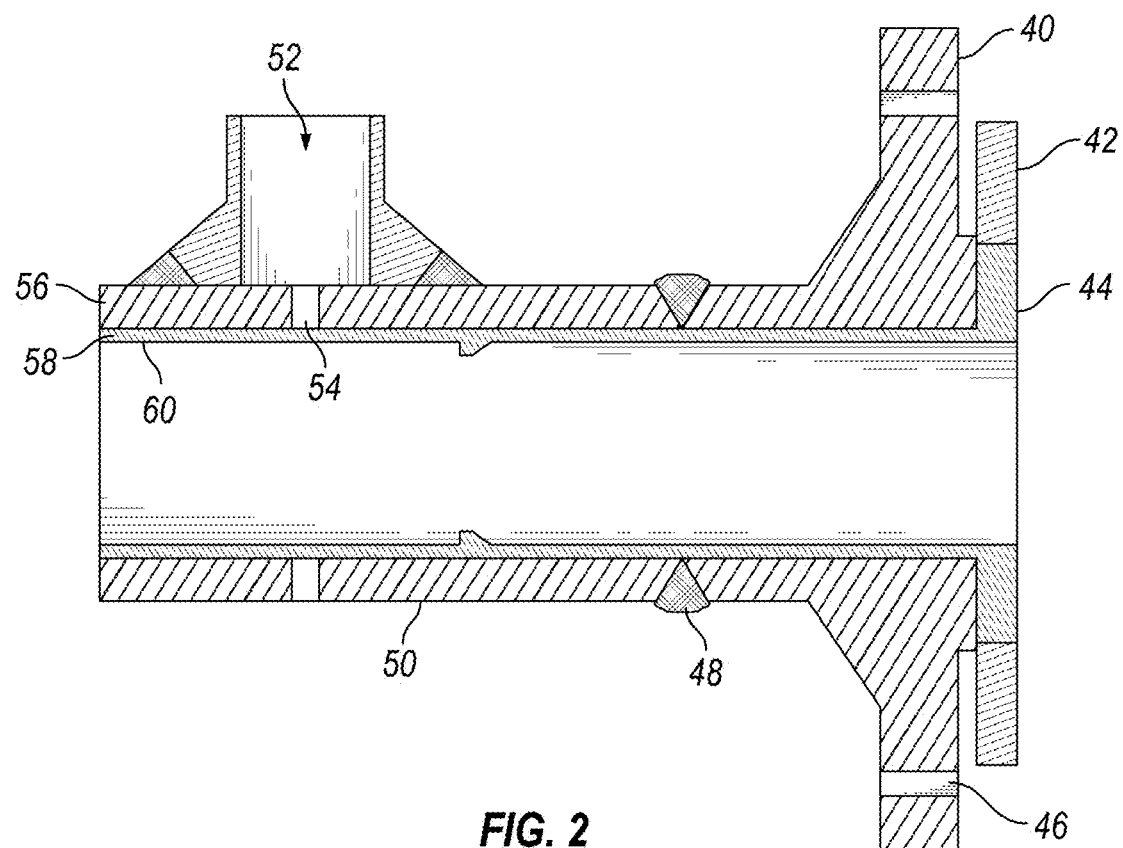
FIG. 2 is a schematic cross-section of a prior art steel pipe end fitted with a liner flange adaptor.
Figure 3:
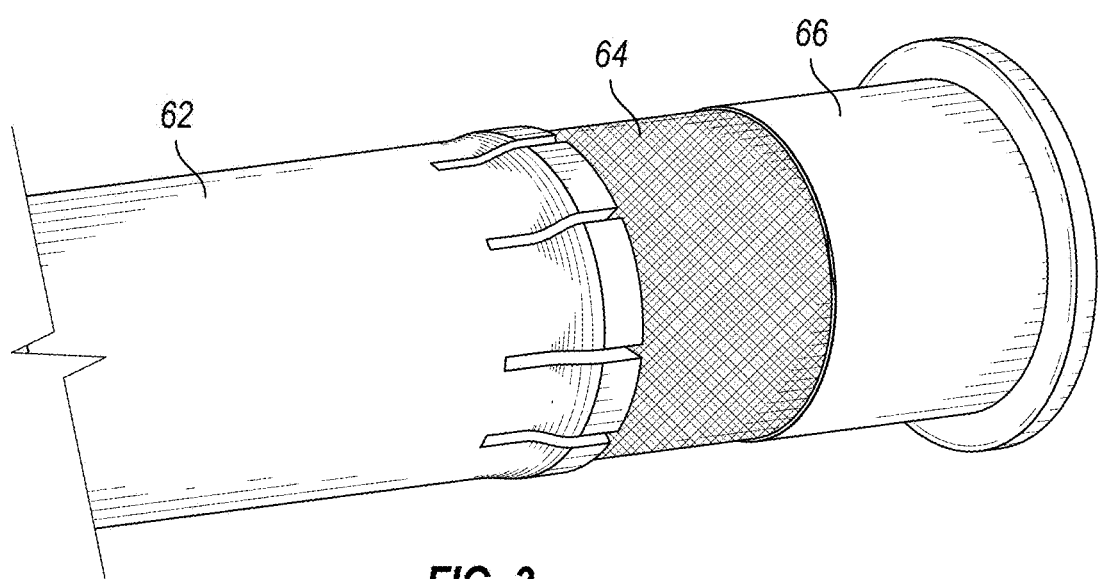
FIG. 3 shows a liner flange adaptor in isolation.

According to a certain aspect of the present invention is provided a flexible polymeric pipe for transportation of oil, gas or water, comprising: a polymeric inner layer surrounding a conduit for oil gas and/or water; an unbonded reinforcing intermediate layer surrounding said inner layer; a polymeric outer layer surrounding said intermediate layer; at least one vent through the outer layer, acting as a conduit between the intermediate layer and an exterior environment; said vent being generally impervious to water and generally pervious to air and gas.

In certain embodiments, either or both of the polymeric inner layer and the polymeric outer layer is made from a polyolefin.

In certain embodiments, the vent comprises a membrane which is generally impervious to water and generally pervious to air and gas.

In certain embodiments, the membrane is a Gore-Tex membrane.

According to another aspect of the present invention is provided a crimp fitting for the connection of two flexible polymeric pipes, each of said two flexible polymeric pipes having a polymeric inner layer having an inner surface surrounding a conduit for oil, gas and/or water, an unbonded reinforcing intermediate layer surrounding said inner layer, and a polymeric outer layer surrounding said intermediate layer and having an outer surface, a said crimp fitting comprising: a mandrel configured to friction fit to the inside surface of a pipe; A sleeve, connected to said mandrel and configured to fit overtop of the outside surface of the pipe and be crimped thereto; At least one vent on said sleeve or at the interface of said mandrel and said sleeve, said vent oriented to act as a conduit between the intermediate layer and an exterior environment; said vent being generally impervious to water and generally pervious to air and gas.

In certain embodiments, the vent comprises a membrane which is generally impervious to water and generally pervious to air and gas.

In certain embodiments, the membrane is a Gore-Tex membrane.

According to yet a further aspect of the present invention is provided a lined steel pipe for transportation of oil and gas, comprising: a steel pipe; a polyolefin lining; an annulus between said steel pipe and said polyolefin lining; at least one vent through the steel pipe, acting as a conduit between the annulus and an exterior environment; said vent being generally impervious to water and generally pervious to air and gas.

In certain embodiments, the vent comprises a membrane which is generally impervious to water and generally pervious to air and gas.

In certain embodiments, the membrane is a Gore-Tex membrane.

According to yet a further aspect of the present invention is provided a fitting for the connection of two lined steel pipes, each of said lined steel pipes having a steel pipe, a polyolefin lining, and an annulus between said steel pipe and said polyolefin lining, said fitting comprising: a steel connector having a vent acting as a conduit between the annulus and an exterior environment; said vent being generally impervious to water and generally pervious to air and gas.

In certain embodiments, the vent comprises a membrane which is generally impervious to water and generally pervious to air and gas.

In certain embodiments, the membrane is a Gore-Tex membrane.

DETAILED DESCRIPTION

Adding a vent seal to oil and gas pipeline annulus vents, said vent seal being generally impervious to water but able to vent air and organic gases, provides an advantageous improvement over the prior art. The vent seal may be in the form of a gas-permeable, water impermeable membrane such as a Gore-Tex™ membrane. The vent seal may be incorporated into vents, for example, into the vents found in crimp fittings for use with a composite pipe, or the steel flange of a lined steel pipe. Alternatively, the vent seal may be a separate component, retro-fittable onto said crimp fitting or steel flange. Composite pipe lengths may also be manufactured having vents and vent seals of the present invention incorporated within their lengths, as may steel pipeline lengths.

Figure 4:
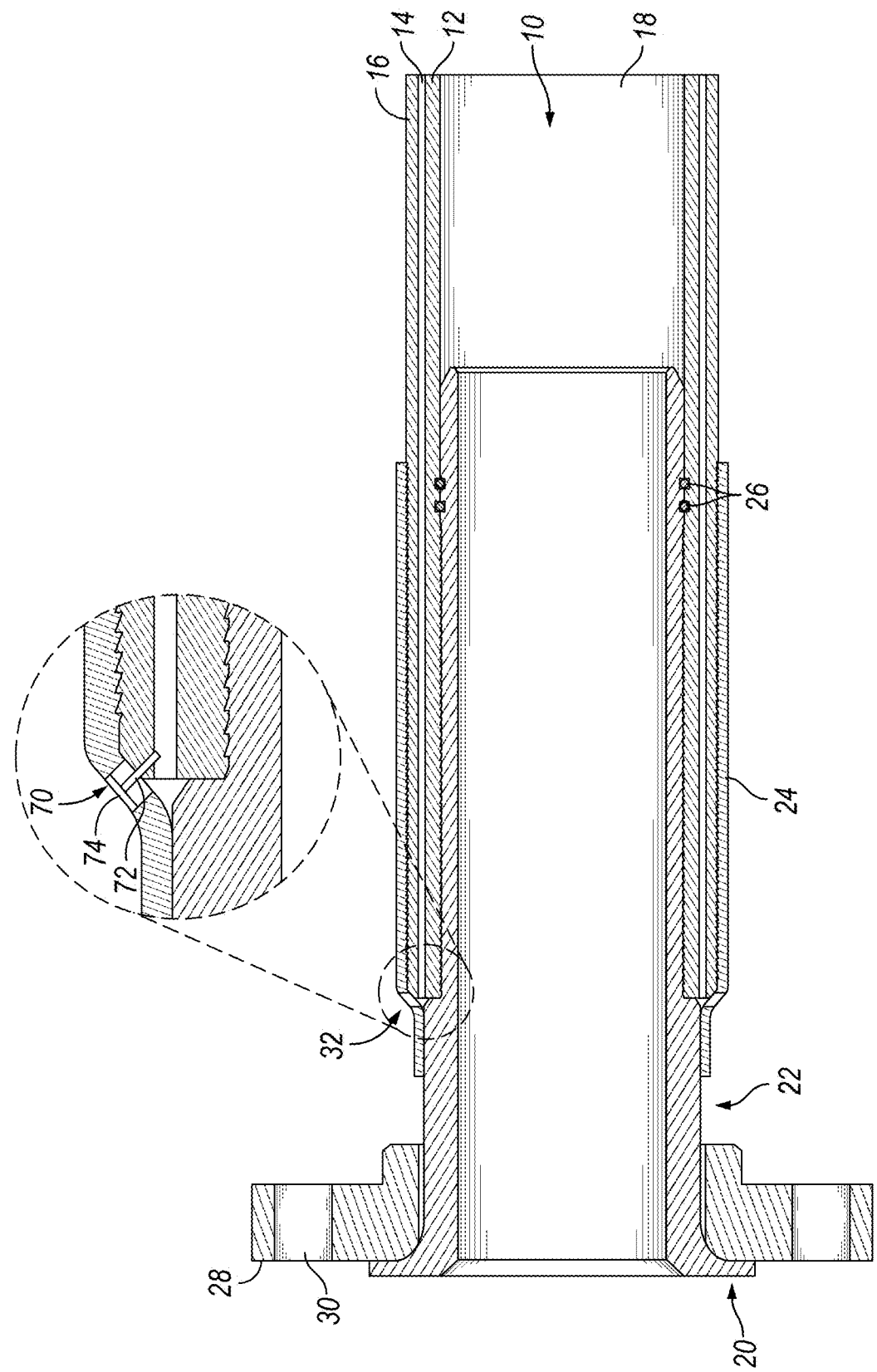
FIG. 4 is a schematic cross-section of a vented crimp fitting fitted to the end of a flexible composite pipe.

One example of such a vent seal is shown in FIG. 4. FIG. 4 shows the flexible composite pipe length 10 and crimp fitting 20 of FIG. 1, having vent 32 within the crimp fitting 20 as previously described. Close-up view 4A shows the same vent 32, configured with a vent seal 70 of the present invention. Vent seal 70 highlights vent conduit or vent hole 72, which is covered in vent cover 74, which is a piece of Gore-Tex™ affixed to the sides of the crimped sleeve 24 surrounding the vent hole 72. The vent cover 74 may be affixed, for example, using an adhesive "donut" around its circumference and between it and the crimp fitting 20, such that there is still a portion of vent cover 74 overtop of vent hole 72 which does not have adhesive.

Figure 5:
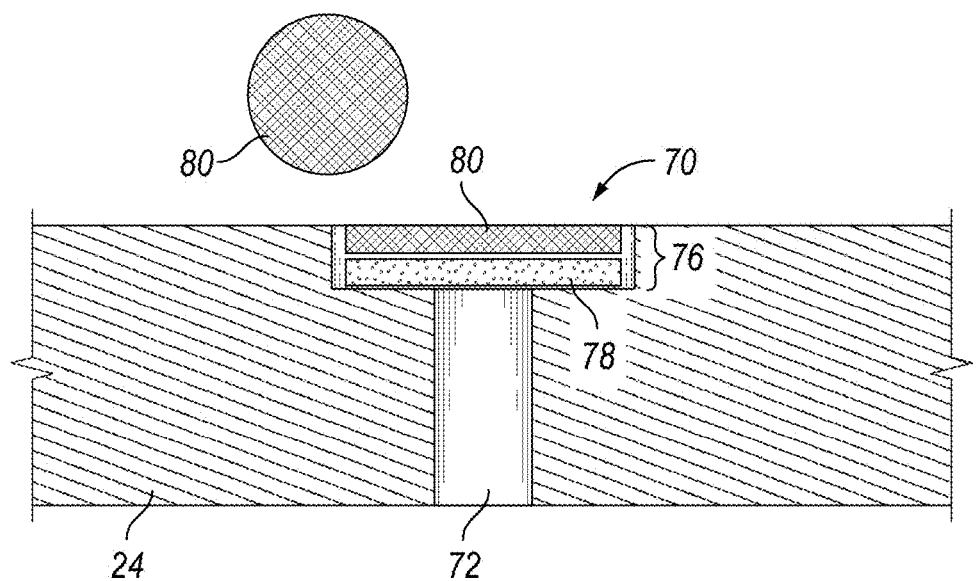
FIG. 5 is a close-up schematic cross-section of a crimp fitting having a vent of the present invention.

An alternative configuration of the vent seal is shown in FIG. 5. Shown is a close-up of vent seal 70 having vent hole 72 through crimped sleeve 24. In this configuration, the vent seal 70 comprises a recessed area 76, which is larger in circumference than vent hole 72, and which is deep enough to allow for flush-mounting of the vent cover components (membrane 78 and mesh 80, which are described in more detail, below). In certain embodiments, the recessed area 76 is 2 cm in diameter and 1.0 mm deep.

Recessed area 74 contains a membrane 78, for example an ePTFE-based membrane, or a laminate comprising a fabric and an ePTFE-based membrane (for example a Gore-Tex™ membrane such as a 3-layer Gore-Tex™ fabric), which surrounds and covers vent hole 72. The membrane 78 may be affixed to the surface of the recessed area 76 with adhesive, or it may be free-floating. Overtop of membrane 78 is mesh 80, which provides impact resistance to membrane 78 but which is typically both water and gas pervious. Mesh 80 may be, for example, a sintered steel disk, for example, of 74 micron 2 ply sintered stainless steel. Mesh may be affixed using an adhesive, such as Loctite™, may be welded in place, and/or a porous patch or tape may be applied overtop of the entire vent area to keep the mesh 80 and membrane 78 in place.

Figure 5B:
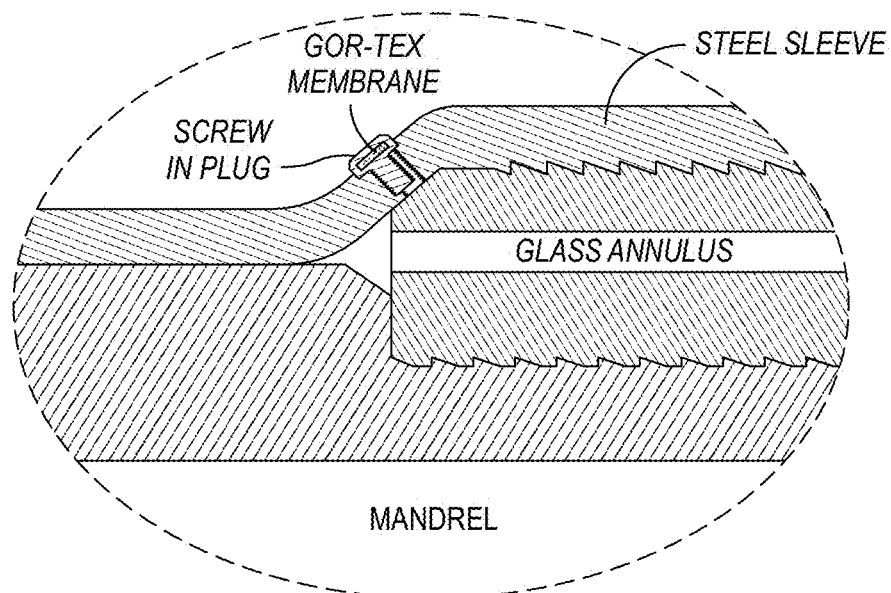
FIG. 5b is a schematic cross-section of a vented crimp fitting fitted to the end of a flexible composite pipe, having a screw-in vent seal.

FIG. 5B shows an alternate configuration, utilizing a Gore-Tex screw-in plug vent seal.

Figure 6:
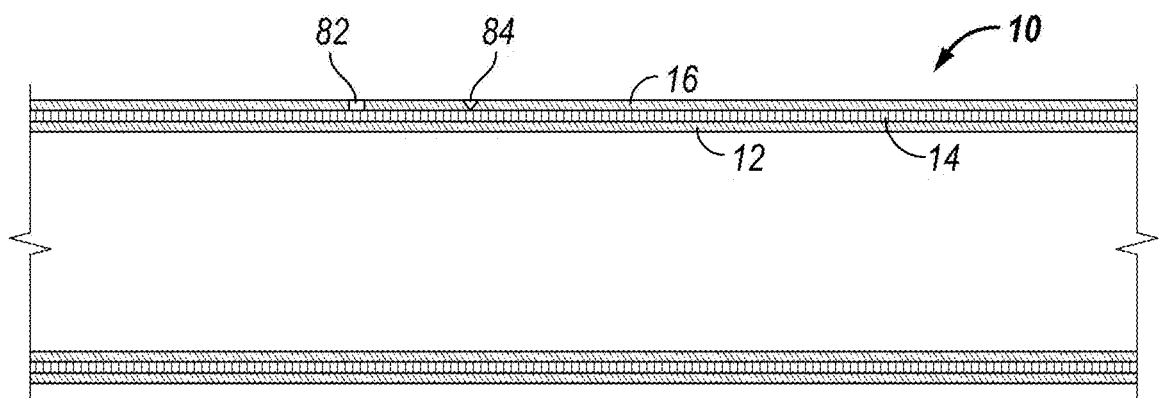
FIG. 6 is a schematic cross-section of a flexible composite pipe having vents for the intermediate layer.
Figure 7:
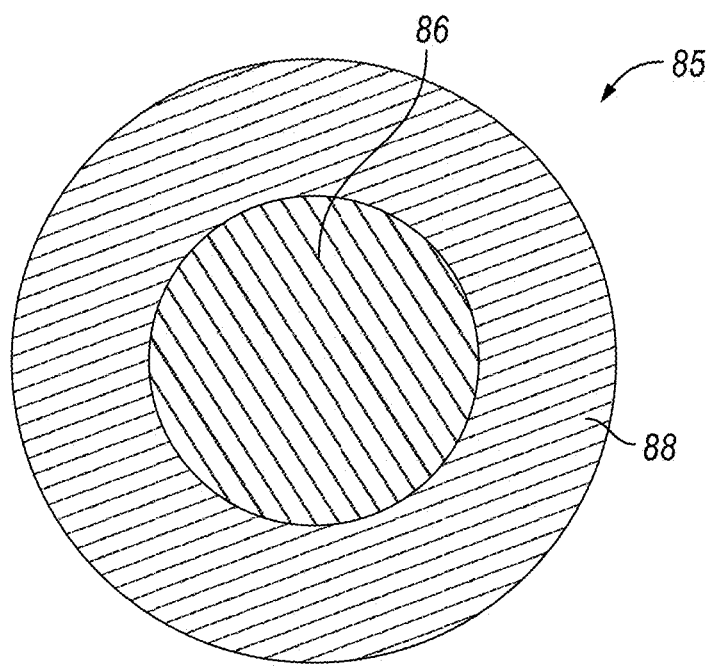
FIG. 7 is a schematic representation of a vent seal used to seal the vents shown in FIG. 6.

In an alternate configuration, the sealed vent may be within the outer surface of a flexible composite pipe. A schematic cross-section view of a flexible composite pipe length 10 is shown in FIG. 6, including inner polyolefin layer 12, fiberglass reinforcing layer 14, and outer polyolefin layer 16. FIG. 6 shows two vent holes 82, 84. The configuration of vent hole 82 is an 8 mm hole. Vent hole 84 is also an 8 mm exterior hole, however it tapers to 3 mm at the reinforcing layer 14. Both these vent holes can be covered with a Gore-Tex vent hole cover 85 having the configuration shown in FIG. 7, available from W. L Gore and Associates and bearing vent model number VE-08 14, as an example. Such a vent hole cover 85 has a Gore-Tex™ inner circumference 86, surrounded by a "donut" of adhesive 88, has an inner diameter of 8 mm (the diameter of inner circumference 86), an outer diameter of 14 mm (the diameter of outer adhesive 88), a vent area of 50 $mm^2$ and an air flow of 575 ml/min.

As would be understood by a person of skill in the art, the adhesive vent hole covers may be replaced with Gore™ vents screw-in series (W. L. Gore and Associates), which provide rugged, screw-in construction, Gore™ vents snap-in series (W. L. Gore and Associates), which allow for rapid, snap-in installation, or other membrane configuration that allows for movement of air and hydrocarbon gas but prevents ingress of water.

Example 1: Flexpipe Gore-Tex Vent Seal

Figure 8:
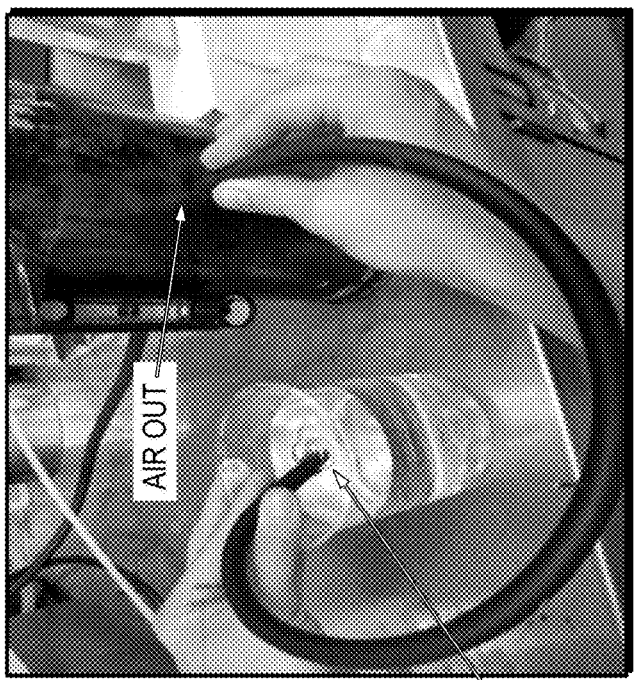
FIG. 8 is a photograph depicting an air pressure equalization testing of a vent seal on steel crimp configuration.
Figure 8:
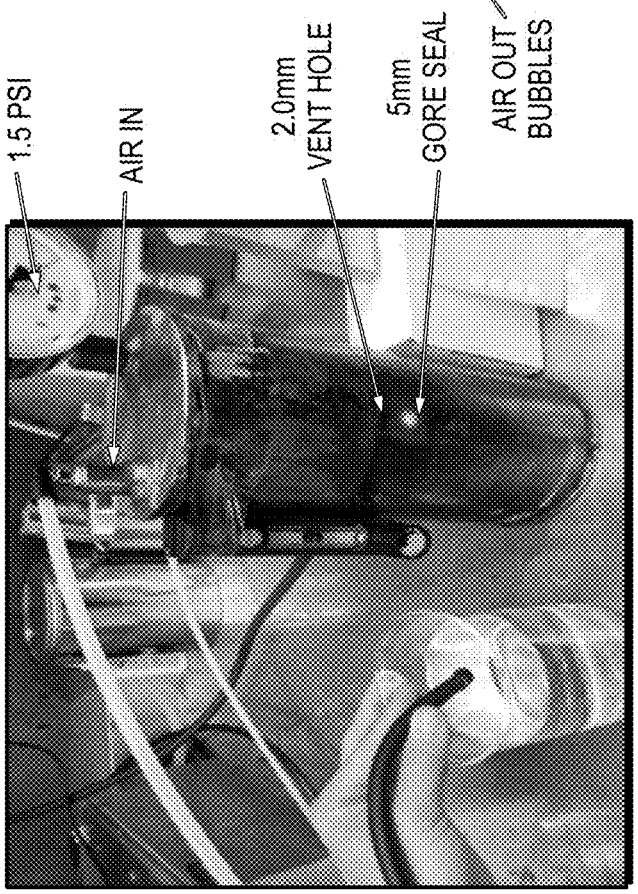

A 1.5 foot section of 4 inch Flexpipe™ flexible composite pipe crimp fitting (Flexpipe, Canada) was modified by drilling a 2 mm vent hole through its outer polyethylene layer. The bottom of the section of pipe was sealed. The top of the section of pipe was sealed but fitted with a compressed air intake. A 5 mm Gore adhesive vent seal (W. L. Gore and Associates) was affixed to the outside of the crimp fitting, surrounding the 2 mm vent hole. A photo of the apparatus can be seen in FIG. 8. The compressed air intake was calibrated to provide 1.5 psi of pressure (0.5 cubic.ft/hr) to the pipe conduit, for five days. The pipe exhibited steady state pressure equalization, with 1.5 psi of pressure released from the vent. As can seen in the photo, one end of a rubber tube was pressed against the vent and the other end was placed in the water in a beaker. The air escaping from the vent formed a steady flow of bubbles through the water.

Example 2: Gore-Tex Vent Seal Water Imperviousness Test

Figure 9:
FIG. 9 is a photograph depicting a water testing of a vent seal.
Figure 9:
Figure 10:
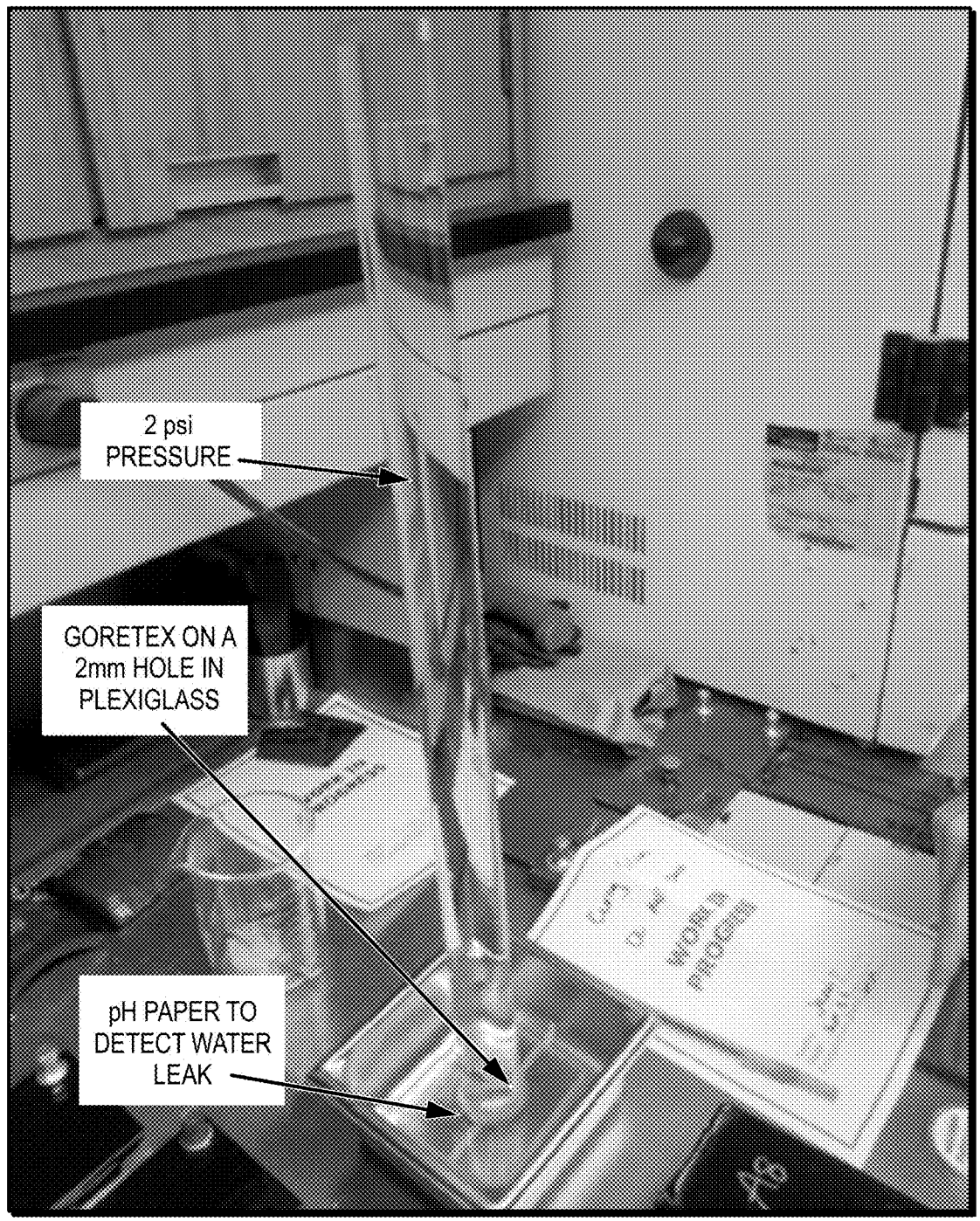
FIG. 10 is a photograph depicting a water testing of a vent seal.

A water column having a 2 mm hole was sealed with a 5 mm Gore-tex vent seal. It was then filled to a level calculated to approximate 1 psi of pressure, with acidic water in order to affect a color change in the pH paper if a leak occurred. The hole was placed over pH paper to identify water leaks through the Gore-tex vent seal in a highly sensitive manner. No leaks were observed (and the pH paper remained neutral)

after 6 weeks (See FIG. 9). The test was repeated with 2 psi pressure, and again no leaks were observed after 4 weeks (See FIG. 10).

The invention claimed is:

1. A flexible polymeric pipe for transportation of oil, gas or water, comprising:
    (a) a polymeric inner layer surrounding a conduit for oil gas and/or water;
    (b) an unbonded reinforcing intermediate layer surrounding said inner layer;
    (c) a polymeric outer layer surrounding said intermediate layer;
    (d) at least one vent through the outer layer, acting as a conduit between the intermediate layer and an exterior environment;
    (e) said vent being generally impervious to water and generally pervious to air and gas,
wherein either or both of the polymeric inner layer and the polymeric outer layer is made from a polyolefin,
wherein the vent comprises a membrane which is generally impervious to water and generally pervious to air and gas, and
wherein the membrane is an expanded polytetrafluoroethylene (ePTFE) membrane.

2. A fitting for the connection of two flexible polymeric pipes, each of said two flexible polymeric pipes having a polymeric inner layer having an inner surface surrounding a conduit for oil, gas and/or water, an unbonded reinforcing intermediate layer surrounding said inner layer, and a polymeric outer layer surrounding said intermediate layer and having an outer surface, said fitting comprising:
    (a) a mandrel configured to friction fit to the inside surface of a pipe;
    (b) a sleeve, connected to said mandrel and configured to fit overtop of the outside surface of the pipe;
    (c) at least one vent on said sleeve or at the interface of said mandrel and said sleeve, said vent oriented to act as a conduit between the intermediate layer and an exterior environment;
    said vent being generally impervious to water and generally pervious to air and gas, wherein the vent comprises a membrane which is generally impervious to water and generally pervious to air and gas.

3. The fitting of claim 2 wherein the membrane is an expanded polytetrafluoroethylene (ePTFE) membrane.

4. A lined steel pipe for transportation of oil and gas, comprising:
    (a) a steel pipe;
    (b) a polyolefin lining;
    (c) an annulus between said steel pipe and said polyolefin lining;
    (d) at least one vent through the steel pipe, acting as a conduit between the annulus and an exterior environment;
    (e) said vent being generally impervious to water and generally pervious to air and gas,
wherein the vent comprises a membrane which is generally impervious to water and generally pervious to air and gas.

5. The lined steel pipe of claim 4 wherein the membrane is an expanded polytetrafluoroethylene (ePTFE) membrane.

6. A fitting for the connection of two lined steel pipes, each of said lined steel pipes having a steel pipe, a polyolefin lining, and an annulus between said steel pipe and said polyolefin lining, said fitting comprising:
    (a) a steel connector having a vent acting as a conduit between the annulus and an exterior environment;
    (b) said vent being generally impervious to water and generally pervious to air and gas,
wherein the vent comprises a membrane which is generally impervious to water and generally pervious to air and gas.

7. The fitting of claim 6 wherein the membrane is an expanded polytetrafluoroethylene (ePTFE) membrane.

* * * * *